(12) United States Patent
Boecker et al.

(10) Patent No.: US 10,209,120 B2
(45) Date of Patent: Feb. 19, 2019

(54) LEVEL SENDER WITH CONTACTLESS SENSOR

(71) Applicant: TI Group Automotive Systems, L.L.C., Auburn Hills, MI (US)

(72) Inventors: Albert J. Boecker, Ettlingen (DE); Garrett M. Tetil, Vassar, MI (US)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 81 days.

(21) Appl. No.: 15/045,401

(22) Filed: Feb. 17, 2016

(65) Prior Publication Data

US 2016/0238430 A1 Aug. 18, 2016

Related U.S. Application Data

(60) Provisional application No. 62/117,830, filed on Feb. 18, 2015, provisional application No. 62/187,354, filed on Jul. 1, 2015.

(51) Int. Cl.
*G01F 23/38* (2006.01)

(52) U.S. Cl.
CPC .................... *G01F 23/38* (2013.01)

(58) Field of Classification Search
CPC ....................................... G01F 23/38
USPC .......................................... 73/317
See application file for complete search history.

(56) References Cited

U.S. PATENT DOCUMENTS

| | | | | | |
|---|---|---|---|---|---|
| 3,016,192 A | * | 1/1962 | Cook, Jr. | ................ | G01F 23/50 235/94 R |
| 3,709,038 A | * | 1/1973 | Werner | .................... | G01F 23/52 73/313 |
| 3,780,582 A | * | 12/1973 | Ajero | ..................... | G01F 23/00 137/558 |
| 5,148,709 A | * | 9/1992 | Ross, Jr. | ................. | G01F 23/48 116/228 |
| 5,410,913 A | * | 5/1995 | Blackburn | .............. | G01F 23/48 200/84 C |
| 5,435,181 A | * | 7/1995 | Koebernik | .............. | G01F 23/52 200/84 C |
| 6,453,741 B1 | * | 9/2002 | Beck, II | .................. | G01F 23/38 340/623 |

(Continued)

FOREIGN PATENT DOCUMENTS

| WO | WO 88/01046 A1 | 2/1988 |
|---|---|---|
| WO | WO 2014/115173 A2 | 7/2014 |
| WO | WO 2015/014534 A1 | 2/2015 |

OTHER PUBLICATIONS

*Precision Hall Effect Angle Sensor IC with I²C Interface*, Allegro MicroSystems, LLC, A1332-DS, Rev. 2, Copyright 2011-2015, pp. 1-19.

(Continued)

*Primary Examiner* — Lisa Caputo
*Assistant Examiner* — Nathaniel T Woodward
(74) *Attorney, Agent, or Firm* — Brinks Gilson & Lione

(57) ABSTRACT

A level sender for a tank includes a sensor device. A driven member is associated with a float assembly. The sensor device is adapted to determine a level of fluid within the tank based on an angular position of the driven member. A float arm is coupled to a float at a first end and is coupled to the driven member at a second end.

17 Claims, 9 Drawing Sheets

(56) References Cited

U.S. PATENT DOCUMENTS

| | | | |
|---|---|---|---|
| 7,093,485 B2* | 8/2006 | Newman | G01F 23/32 |
| | | | 73/317 |
| 7,201,052 B2 | 4/2007 | Lee | |
| 8,015,871 B2 | 9/2011 | Sohn et al. | |
| 8,136,396 B2* | 3/2012 | Mundo | G01F 23/38 |
| | | | 73/317 |
| 2004/0182151 A1 | 9/2004 | Meure | |
| 2005/0103103 A1 | 5/2005 | Newman et al. | |
| 2013/0146604 A1 | 6/2013 | Moreno et al. | |
| 2015/0008907 A1* | 1/2015 | Janisch | G01D 5/145 |
| | | | 324/207.25 |
| 2015/0308880 A1 | 10/2015 | Go et al. | |

OTHER PUBLICATIONS

Ams Datasheet, AS5600, *12-bit Programmable Contactless Potentiometer*, [v1-01] Oct. 14, 2014, pp. 1-43.

International Search Report, Serial No. PCT/US2016/018155, dated Jun. 29, 2016.

International Preliminary Report on Patentability, International Application No. PCT/US2016/018155, dated Aug. 31, 2017, 6 pages.

* cited by examiner

LEVEL SENDER WITH CONTACTLESS SENSOR

CROSS REFERENCE TO RELATED APPLICATIONS

This application claims the benefit of U.S. Provisional Patent Application Ser. No. 62/117,830, filed Feb. 18, 2015, entitled "Level Sender," and U.S. Provisional Patent Application Ser. No. 62/187,354, filed Jul. 1, 2015, entitled "Level Sender," the content of which are hereby incorporated by reference in their entirety.

TECHNICAL FIELD

The present disclosure relates to a device for monitoring the level of a fluid within a tank.

BACKGROUND

Fuel tanks may be used to retain a supply of liquid fuel in a fuel system. Such fuel systems may be used, for example, in automotive applications to deliver fuel for combustion within an engine. A level sender may be used to monitor and provide a signal indicative of the level of fuel in the fuel tank. The tank and level sender may be used with fluids other than fuel and in applications other than vehicle fuel systems. Further improvements in level senders and for determining a level of fluid within a tank are desirable.

SUMMARY

In an exemplary embodiment, a level sender for a tank includes a sensor device. A driven member is associated with a float assembly. The sensor device is adapted to determine a level of fluid within the tank based on an angular position of the driven member. A float arm is coupled to a float at a first end and is coupled to the driven member at a second end.

In another exemplary embodiment, a level sender for a tank includes a sensor device. A driven member is configured to axially rotate. The sensor device is configured to determine a level of fluid within the tank based on an axially rotated position of the driven member. A float assembly is configured for carrying and axially rotating the driven member and includes a float arm that is directly coupled to the driven member.

In another exemplary embodiment, a method for determining a level of fluid within a tank is provided. The method includes axially rotating a driven member via a float assembly that is in communication with fluid within the tank. The float assembly includes a float arm that is directly coupled to the driven member. Using a sensor device, an axially rotated position of the driven member is determined associated with the level of fluid within the tank.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
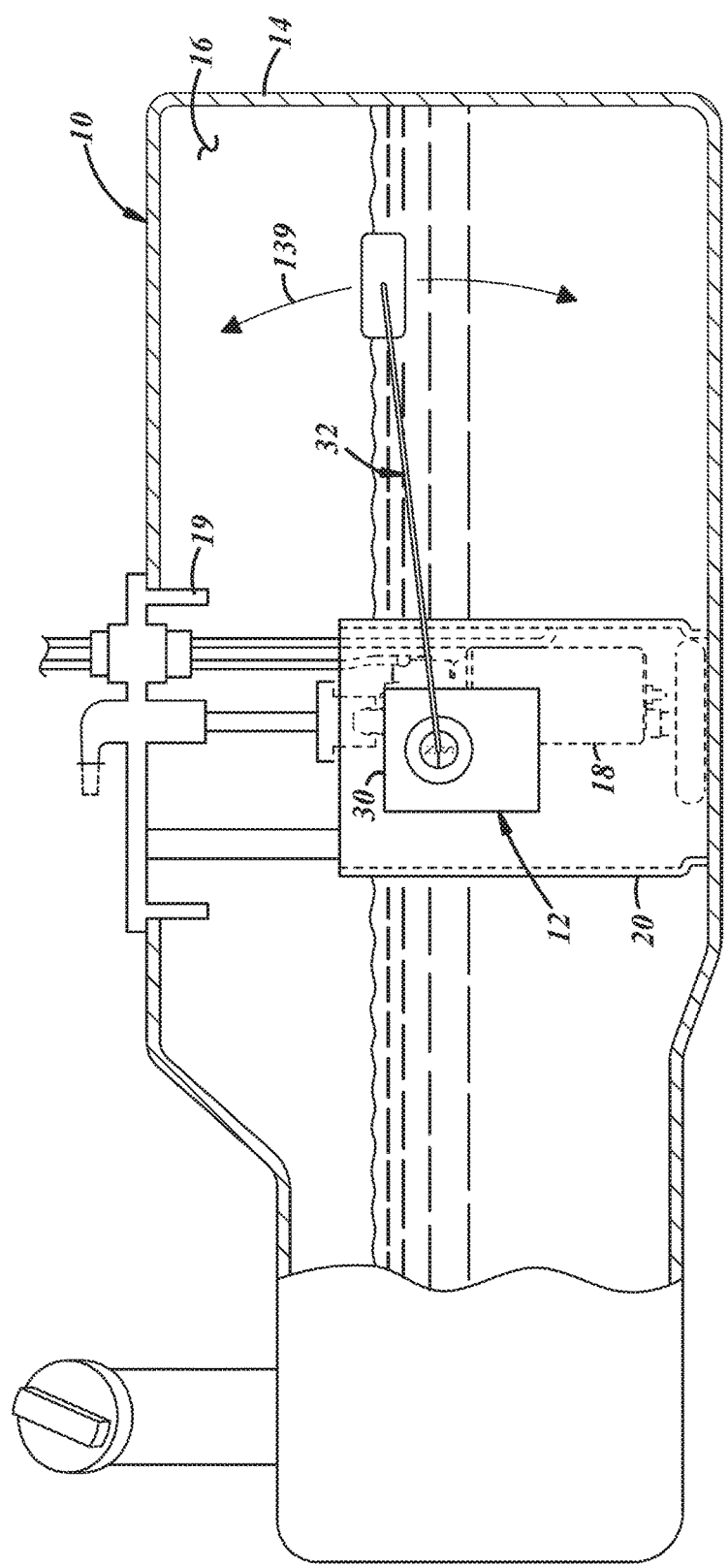
FIG. 1 is a partially sectioned view of a fuel tank and a level sender coupled to a fuel pump reservoir.

Referring in more detail to the drawings, FIG. 1 illustrates a tank 10, such as a fuel tank that may be used to retain a supply of liquid fuel in a fuel system, and a level sender 12 associated with the tank 10. Such fuel systems may be used, for example, in automotive applications to deliver fuel for combustion within an engine. The level sender 12 may be used to monitor and provide a signal indicative of the level of fuel in the tank 10. Of course, the tank 10 and level sender 12 may be used with fluids other than fuel and in applications other than vehicle fuel systems.

The fuel tank 10 may include one or more walls 14 defining an internal volume 16 in which the fuel is contained. The fuel tank wall(s) 14 may be formed of any suitable metal or non-metallic material. In one form, the fuel tank 10 may be formed from several layers of polymeric materials, in a so called "multi-layer" fuel tank (e.g., inner and outer layers, one of more adhesive layers, and one or more barrier layers). Alternatively, the tank 10 could be formed from a single material, or could have layers in addition to or other than those specifically noted herein.

Fuel tank 10 is shown carrying a fuel pump 18 within a reservoir 20. In addition, level sender 12 is carried by the reservoir 20; however, this is merely an example. The level sender 12 also could be carried by the fuel pump 18, the tank wall 14, or the like.

Figure 2:
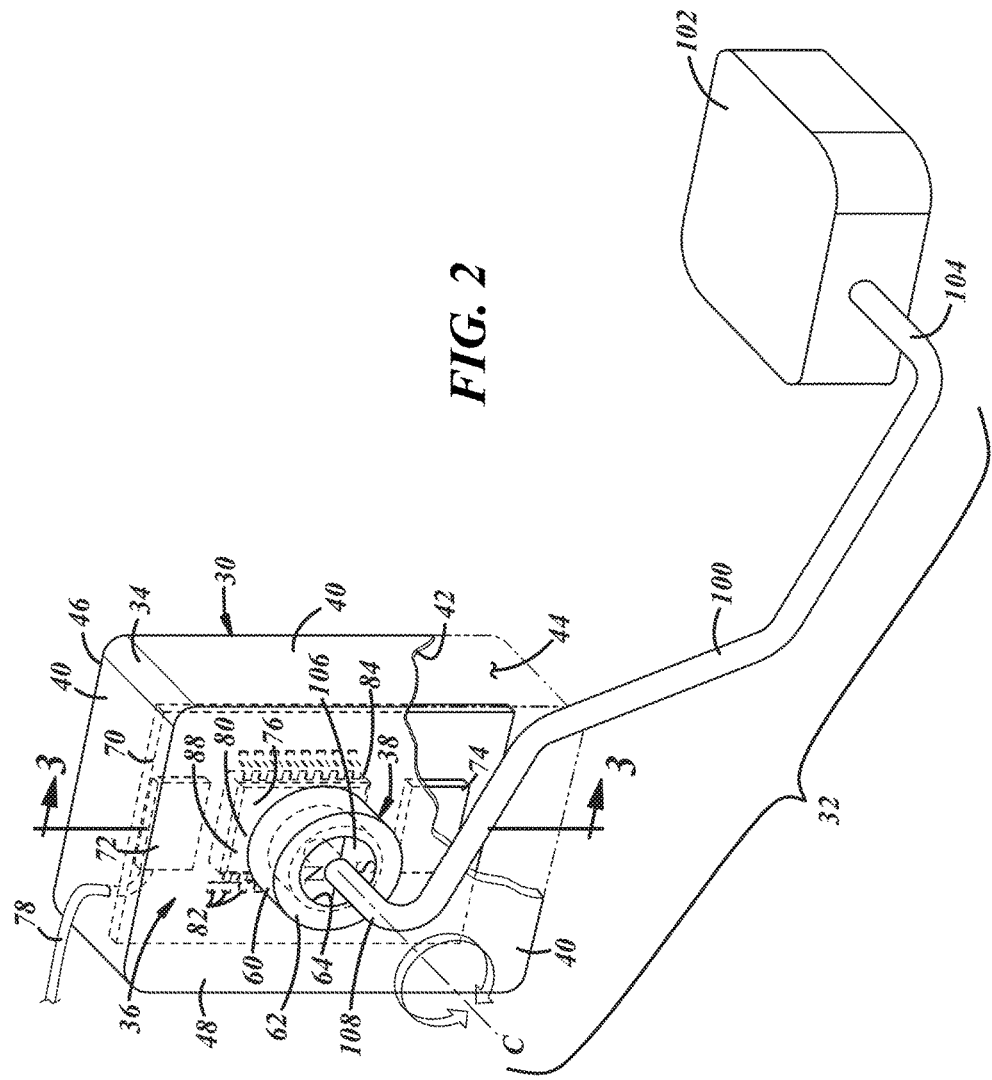
FIG. 2 is a perspective view of the level sender of FIG. 1.

Level sender 12 includes a mount 30 to support the level sender 12 and protect internal electronics and a float assembly 32 coupled to the mount 30. As shown in FIG. 2, mount 30 comprises an carrier 34 for carrying a sensor device 36 which may include level detecting electronics, and a coupler 38 for coupling the float assembly 32.

Carrier 34 includes a number of walls 40 defining the shape of the carrier. Here, a rectangular shape is shown, but this is merely an example; the carrier 34 may have other shapes. An inner surface 42 of the walls 40 define a hollow region 44 that can be sealed from an exterior of the carrier 34; however, sealing is not required. The carrier 34 may be made of any suitable material for use in contact with the fluids in the tank 10 (e.g., polyoxymethylene or POM). One exterior face 46 of the walls 40 may have one or more fastening features (not shown) for securing the mount 30 to the reservoir 20 (shown in FIG. 1) (or the like). Any suitable fastening features may be used. An opposing exterior face 48 may carry the coupler 38 (FIGS. 2-3); e.g., exterior face 48 may have one or more clips 49 for retaining the coupler 38. Of course, this is merely an example; other implementations also exist. For example, the carrier may be integrated or embedded within other fuel tank components (such as the reservoir 20) or into the fuel tank wall 14. For example, the reservoir could have a recess defining the hollow region 44 to which a cover or cover plate could be attached.

Figure 3:
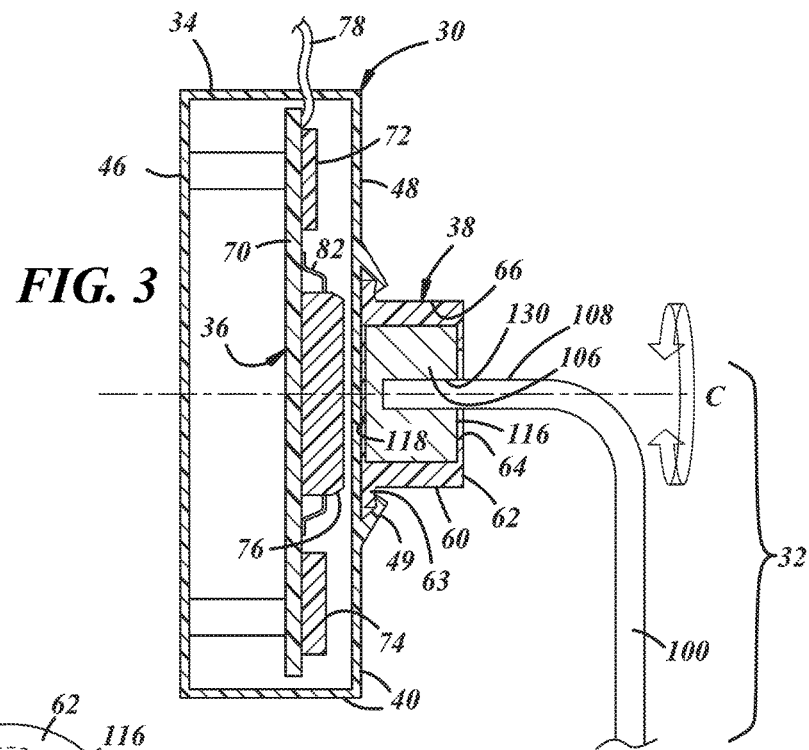
FIG. 3 is a sectional view of a portion of the level sender along section lines 3-3 in FIG. 2.

Coupler 38 may be any structure suitable for coupling and carrying the float assembly 32. The illustrated coupler 38 of FIGS. 2-3 has a cylindrical shape; e.g., a circular wall 60 abuts the opposing exterior face 48 of carrier 34 and an axial end wall 62 of the coupler 38 is spaced from face 48. Alternatively, the coupler 38 could be integrally formed with and from the same piece of material as the exterior face 48 (or as the cover plate in applicable embodiments). Coupler 38 may have one or more retention features 63 that correspond to the clips 49 on exterior face 48; these may be located near the abutment of the circular wall 60. The end wall 62 may have an annular shape, with an aperture 64 centered therein. This of course is merely an example of coupler 38; other shapes are possible. The aperture 64 is in communication with a cylindrical chamber 66 within the coupler 38 (FIG. 3). The shape of the chamber 66 may be defined by interior surfaces of the circular wall 60 and axial end wall 62, as well as the opposing exterior face 48 of the carrier 34. The coupler 38 may be manufactured of the same material as carrier 34.

Sensor device 36 may be carried within the carrier 34 (and sealed therein). The device 36 may include a circuit card assembly (CCA) 70, a processor 72, memory 74, and a contactless sensor 76 may be mounted on the CCA. The CCA 70 may be any suitable electronic card for carrying circuit components and may include wires or traces; e.g., in one embodiment, the CCA 70 is a printed circuit board (PCB). CCA 70 may have a wiring harness or bus 78 for communicating to a downstream electronic control unit (ECU) (not shown) or fuel gauge electronics (not shown).

Processor 72 should be construed broadly to include any type of device capable of processing electronic instructions including microprocessors, microcontrollers, vehicle communication processors, and application specific integrated circuits (ASICs). In one embodiment, processor 72 is a microprocessor. Thus, the processor 72 may execute various types of digitally-stored instructions, such as software or firmware programs stored on memory 74. And in at least one implementation, processor 72 is configured to execute program(s) and process data to carry out at least part of the method discussed herein.

Memory 74 also should be construed broadly to include any suitable non-transitory computer usable or readable medium. Exemplary computer usable storage mediums include RAM (Random Access Memory), ROM (Read Only Memory), EPROM (Erasable, Programmable ROM), EEPROM (Electrically Erasable, Programmable ROM), just to name a few examples.

It should be appreciated that some embodiments of sensor device 36 include one or both of processor 72 and memory 74, and other embodiments do not. For example, sufficient memory 74 could be located in or on the contactless sensor 76. Or memory 74 may not be necessary in some applications. Likewise, processor 72 may not be located on the CCA 70 but instead located elsewhere. Just to list a few non-limiting examples, the processor 72 could be located on the fuel pump 18 (FIG. 1) (e.g., and may or may not be the same as a motor control unit (not shown) for the fuel pump 18), on a tank flange 19 associated with the fuel pump 18 (FIG. 1), in a fuel system electronic control unit (not shown) outside of the tank 10, etc.

Figure 6:
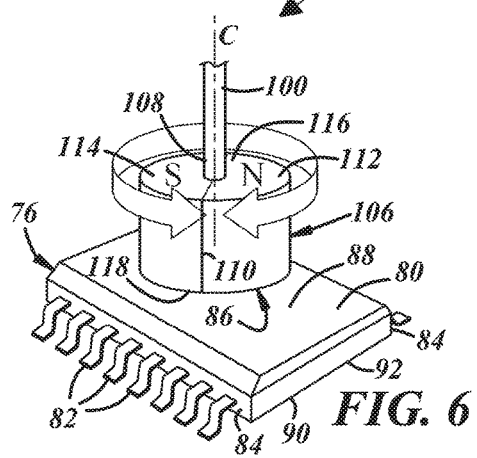
FIG. 6 illustrates one embodiment of a contactless sensor oriented with respect to the driven member of FIG. 5.

Contactless sensor 76 can be any electronic device suitable for determining a change in angular position of a sensed element (see FIG. 6). According to at least one embodiment, contactless sensor 76 is a contactless potentiometer. The sensor 76 may include a body 80 having a plurality of contacts 82 for soldering to CCA 70 (FIGS. 2-3)—the contacts 82 may extend along lateral sides 84 of the body 80 (as shown in FIG. 6). The body 80 comprises at least one sensing surface 86 (e.g., on an upper side 88 of the body 80). In some implementations, the body 80 further includes a second sensing surface 90 (on a lower side 92 of the body 80). One commercially available example of contactless sensor 76 is contactless potentiometer AS5600 by AMS.

Magnetically sensitive circuitry (not shown) may be carried within the body 80 of the contactless sensor 76. For example, an arrangement of Hall sensors may be contained therein. According to one embodiment, the Hall sensors have a circular arrangement defining a center axis C.

Returning to FIGS. 2-3, the position of the contactless sensor 76 on the CCA 70 may locate the center axis C so that it approximately coincides with a longitudinal axis of the cylindrical chamber 66. More specifically, both the position of the CCA 70 within the hollow region 44 as well as the position of the contactless sensor 76 on CCA 70 generally may align the center axis C with the longitudinal axis of the chamber 66. In addition, CCA 70 may be positioned within the hollow region 44 so that the sensing surface 86 (on the body 80 of the sensor 76) is within a predetermined axial proximity of the chamber 66. In at least one embodiment, the sensing surface 86 is adjacent or nearly adjacent the inner surface 42 of the carrier 34.

Now turning to the float assembly 32 shown in FIGS. 2-3, float assembly 32 comprises a float arm 100 carrying a float 102 at a first end 104 and a driven member 106 at a second end 108. Float arm 100 may be any rigid longitudinal member, and float 102 may be any suitably buoyant device for floating on the surface of the fluid in tank 10. In some implementations, float 102 may be capable of swiveling at the first end 104 of the float arm 100. Both float arm 100 and float 102 may be made of any suitable material for use in contact with the fluids in the tank 10.

Figure 5:
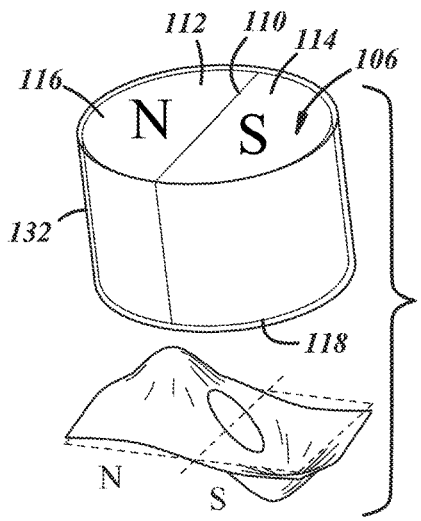
FIG. 5 illustrates one embodiment of a driven member and a corresponding three-dimensional depiction of a magnetic flux density of the driven member.

Driven member 106 at the second end 108 may be any field producing element capable of interacting with contactless sensor 76. In at least one embodiment, driven member 106 is a magnet, such as, but not limited to, a diametric magnet. As used herein, a diametric magnet is a magnetized device having polarization divided North (N) and South (S) along an axially extending diameter 110 as shown best in FIG. 5 (e.g., resulting in a polarized North half 112 and a polarized South half 114). FIG. 5 also illustrates a three-dimensional depiction of the magnetic flux of both halves 112, 114 of the diametric magnet.

Figure 4:
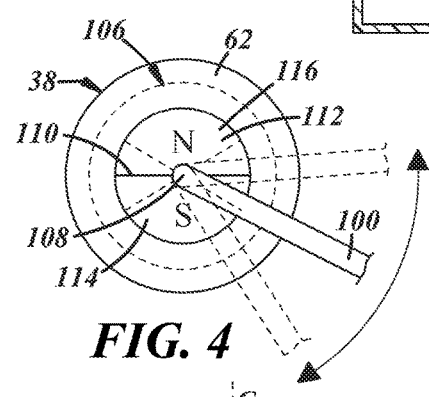
FIG. 4 is a front view of a portion of the level sender shown in FIG. 2.

In some embodiments, diametric magnets have cylindrically- or annularly-shaped bodies. In at least one implementation, driven member 106 is cylindrical having opposing axial ends 116, 118. In addition, as shown in FIGS. 2-3, member 106 is sized to fit within chamber 66 of coupler 38 so that the driven member 106 can axially rotate freely (as in FIG. 4) having axial end 118 facing contactless sensor 76 (FIG. 3). Thus when assembled, according to one embodiment, a longitudinal axis of the driven member 106 may generally align with center axis C of the contactless sensor 76 (as well as the longitudinal axis of chamber 66).

A hole 130 best shown in FIG. 3 may be located along the longitudinal axis of the driven member 106 for fixedly coupling the driven member 106 to the second end 108 of the float arm 100. This hole 130 may be a blind hole—or even a through-hole (when the driven member 106 is an annulus). Hole 130 may be sized for a press-fit, adhesive, or other suitable engagement. This of course is merely an example. Other implementations also exist. For example, the second end 108 of the float arm 100 may be fastened laterally across all or a portion of the axial end 116 of the driven member 106.

Driven member 106 may be coated or covered by a protective material layer 132, as shown in FIG. 5. The coating or layer 132 may be any suitable material to protect the driven member 106 from the corrosive effects of contact with the fluids in the tank 10.

FIG. 1 shows tank 10 carrying fuel. The float 102 of the level sender 12 moves freely upwardly and downwardly within the tank 10 as the level of fuel therein changes. Thus, when the tank 10 is full of fuel, float 102 is at its highest position. And when the tank 10 has no fuel, float 102 is at its lowest position. Thus, the float 102 can travel over a range of motion 139—which range of motion 139 is at least partially defined by the length of the float arm 100 and the shape and size of the tank 10. As float 102 traverses range of motion 139, driven member 106 axially rotates on its longitudinal axis (i.e., the angular position or orientation with respect to the longitudinal axis changes). Angular rotation of driven member 106 changes the orientation of its magnetic flux (e.g., a multi-vector change) with respect to contactless sensor 76 (which is fixed). Contactless sensor 76 provides an electrical output to processor 72 that corresponds to the sensed magnetic flux (e.g., using Inter-Integrated Circuit (I²C) or any other suitable communication protocol). Thus, the contactless sensor 76 can determine an angular position of a static driven member 106 or a changing angular position as the driven member 106 axially rotates. Some embodiments of contactless sensor 76 may have high resolution (e.g., 12-bit resolution). Thus for example, according to one embodiment having a range of motion 139 of 45°, contactless sensor may have 4096 increments representing different fuel levels in tank 10 (or an electrical signal representing a fuel level for every 0.01° of angular rotation of driven member 106).

Processor 72 may correlate the electrical output of contactless sensor 76 to the fuel level. To accomplish this, processor 72 may compare the electrical output to data stored in a look-up table (e.g., stored in memory 74). Processor 72 may perform other functions as well; e.g., in some implementations, processor 72 applies a smoothing algorithm to account for tank slosh (i.e., environmentally induced waves or tilt of tank 10 due to terrestrial terrain). Once processor 72 determines a fuel level value, it provides a signal downstream to an ECU (not shown), fuel gauge electronics (not shown), or the like via harness 78 (e.g., via Controller Area Network (CAN) or any other suitable communication protocol). And this signal is then displayed to a user of the vehicle.

Together, use of contactless sensor 76 and driven member 106 can minimize undesirable hysteresis, unlike conventional resistive wiper systems. In addition, the sensor 76/member 106 pairing are not subject to wear and fatigue like conventional resistive wiper systems, because the two devices are not in contact with one another.

Other embodiments also exist. For example, in the implementation discussed above, the longitudinal axis of the driven member 106 was described as generally coinciding with the center axis C of contactless sensor 76; however, this is not required. In other implementations, the longitudinal axis of driven member 106 may be purposely offset or translated. For example, the contactless sensor 76 may be configured with an alignment tolerance for relatively small offsets (such as the AS5600 by AMS described above), or alternatively, sensor 76 may be configured to determine angular position when the longitudinal axis of the driven member is purposely offset to a larger degree (such as in the commercially available A1332 by Allegro MicroSystems).

Figure 7:
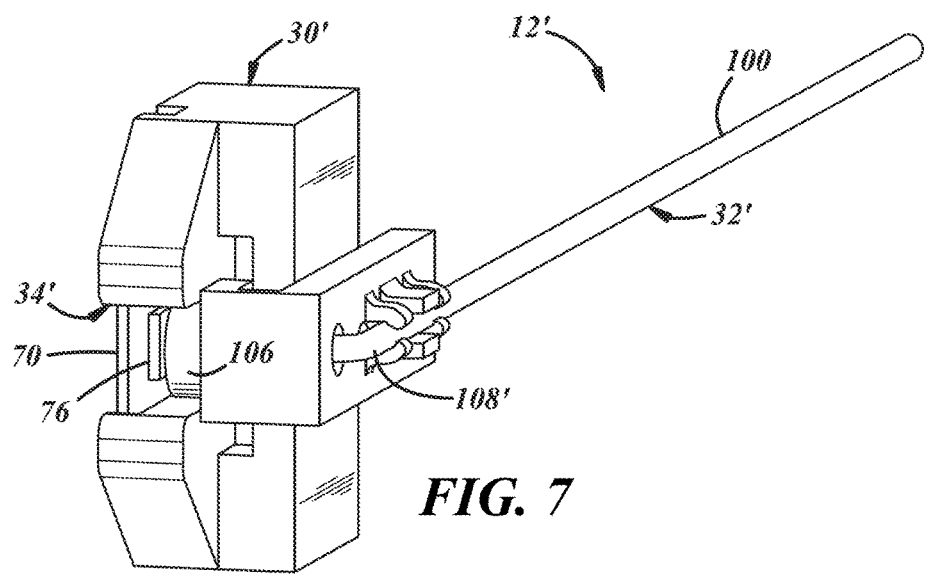
FIGS. 7-11 illustrate perspective views of another embodiment of a level sender.
Figure 8:
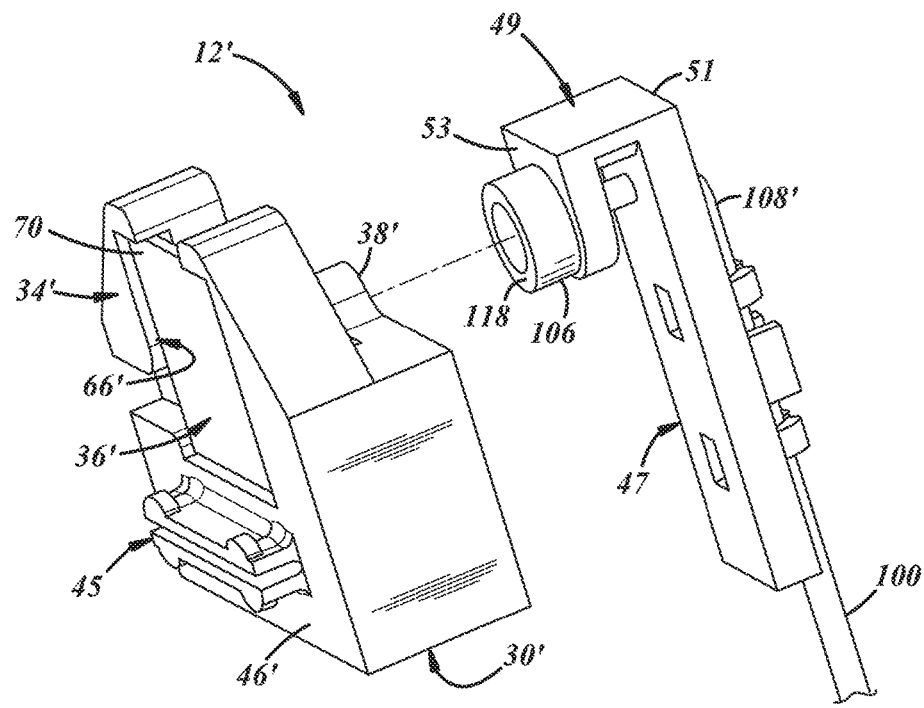
Figure 9:
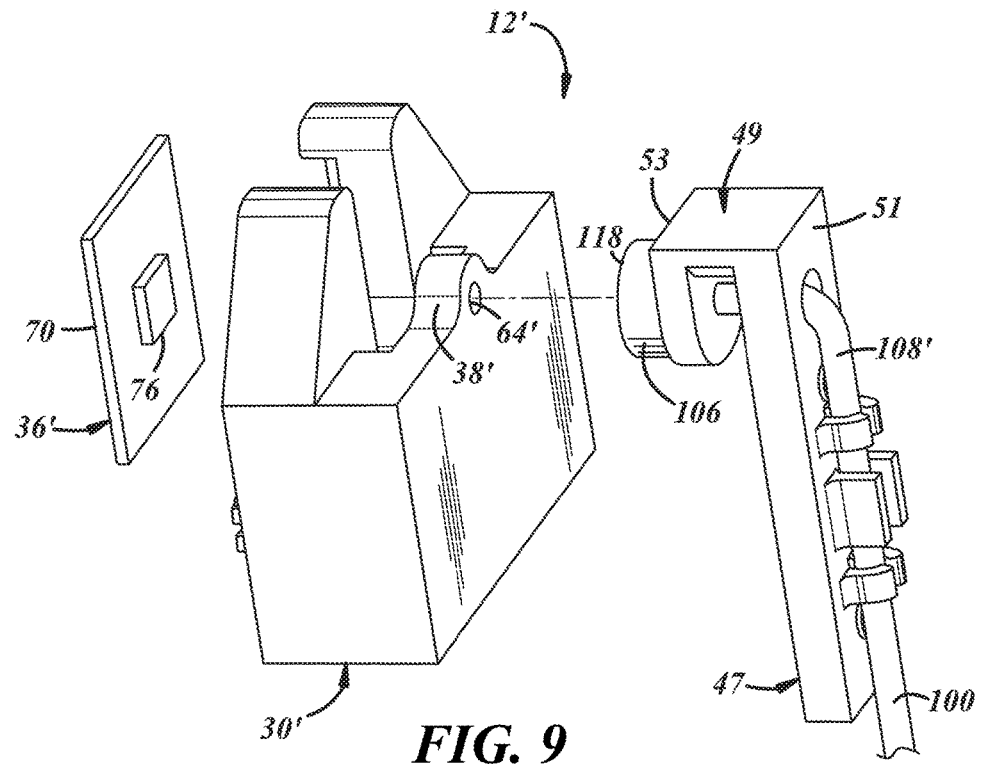
Figure 10:
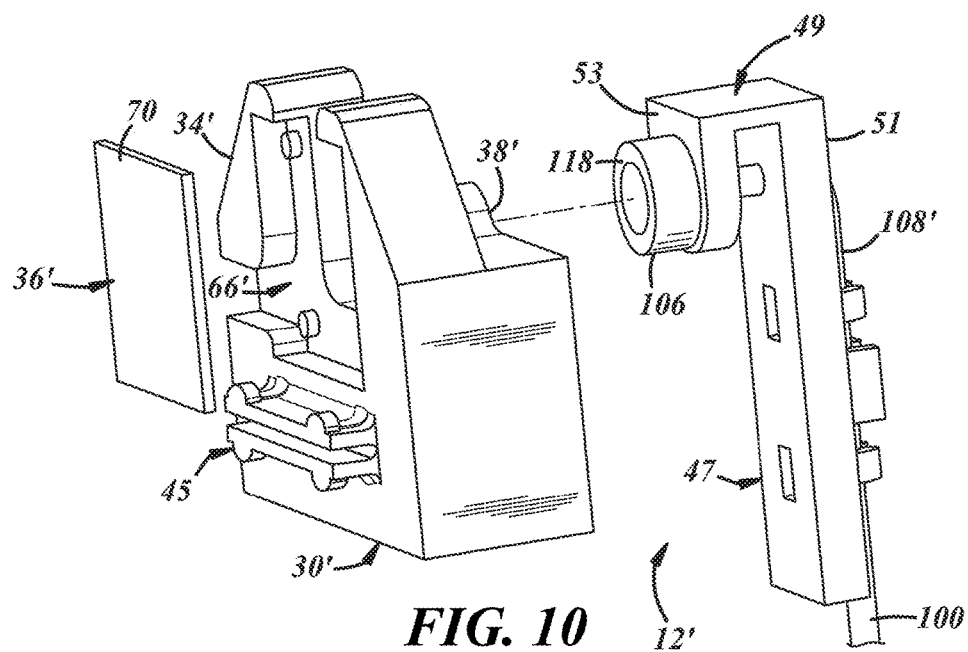
Figure 11:
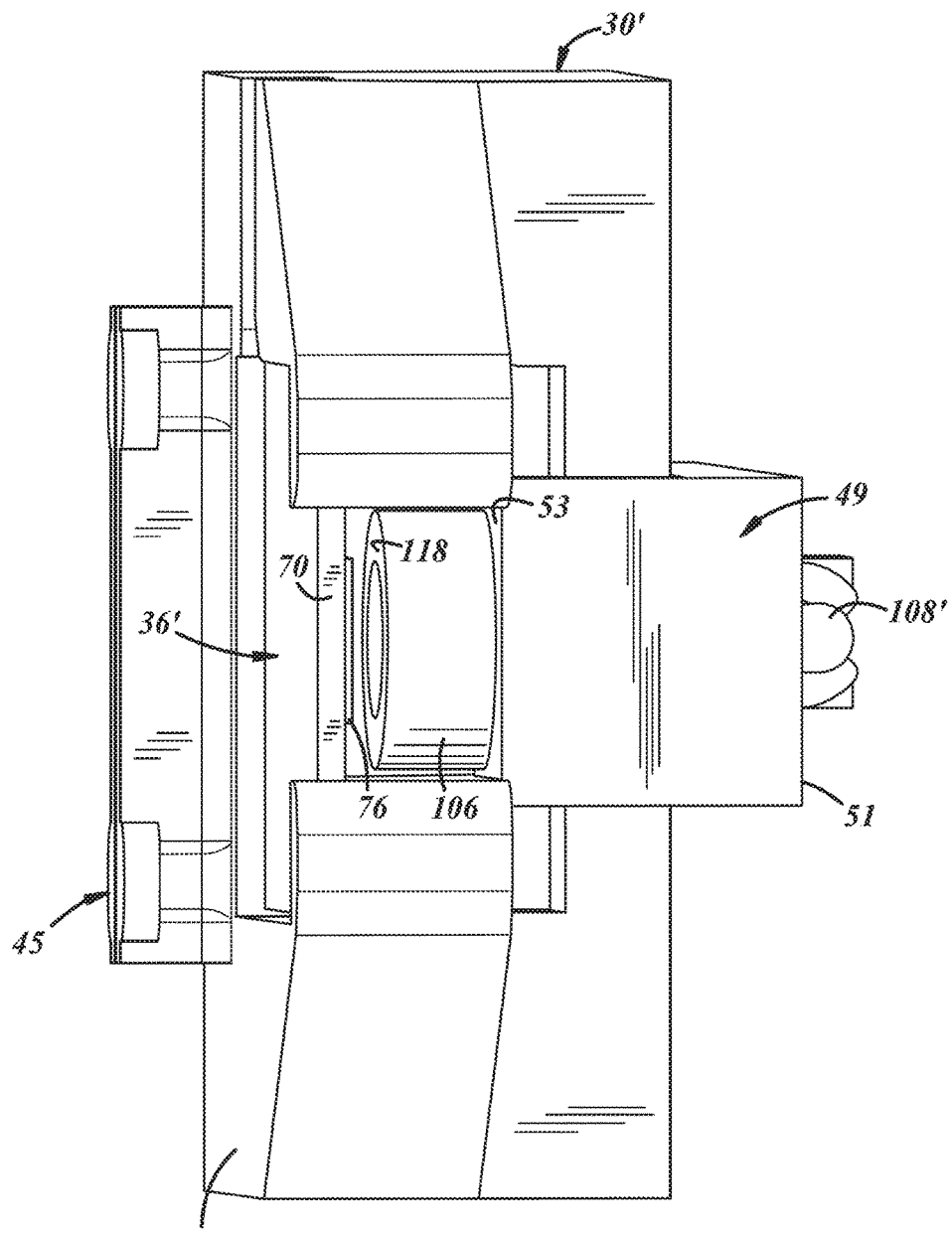

FIGS. 7-11 illustrate another embodiment of a level sender for monitoring a level of fluid in tank 10 and providing a signal indicative of the level. It will be appreciated that like reference numerals below indicate like or similar features and/or functions. FIG. 7 illustrates a portion of a level sender 12'—namely, an carrier 34' of mount 30' is shown coupled to a portion of float assembly 32'. As best shown in FIGS. 8 and 10-11, chamber 66' of the carrier 34' may be arranged to secure sensor device 36' (here illustrating only CCA 70 and contactless sensor 76). In this implementation, chamber 66' of carrier 34' is not sealed (of course, in other embodiments, it could be); thus, in at least one embodiment, the sensor device 36' may have a layer of conformal coating (similar to the coating 132 described above). Mount 30' also may include features 45 on rear exterior face 46' for coupling the mount to the fuel tank components such as the reservoir 20 (shown in FIG. 1). As shown in FIGS. 8-10, mount 30' may have a coupler 38' (shown here as a flange) having an aperture 64' (see FIG. 9) that may be sized to receive a second end 108' of float arm 100.

As shown best in FIGS. 8-10, the second end 108' of float assembly 32' may include a support 47 that couples to the float arm 100 and carries the driven member 106. The support 47 may have a yoke 49 through which float arm 100 passes on one side 51 and carries driven member 106 at the opposing side 53.

When assembled, the yoke 47 may straddle coupler 38' so that the float arm 100 passes into or through the yoke and into or through the aperture 64', as shown in FIGS. 7 and 11. In this assembled position, the driven member 106 may be located at a predetermined proximity to the contactless sensor 76 (e.g., to enable magnetic coupling). In addition, the float assembly 32' is free to pivot via aperture 64' angularly rotating the driven member 106 as the float 102 (not shown in FIGS. 7-11) moves upwardly or downwardly due to changes in fuel level within the tank 10. The level sender 12' functions similarly to level sender 12; for example, contactless sensor 76 can detect axial or angular position of the driven member based on the magnet flux (and/or changes therein).

FIGS. 12-15 illustrate another embodiment of the level sender where at least a portion of the level sender (that includes the sensor device 36) is located outside of tank 10 and another portion of the level sender (that includes the driven member 106) is located within the tank—and a barrier or wall separates the two level sender portions (e.g., including but not limited to a tank flange for sealing a tank opening). In addition, the portion located outside tank 10 may be generally aligned with the portion inside tank 10 along an axis C'. Again, it will be appreciated that like reference numerals below indicate like or similar features and/or functions.

Figure 13:
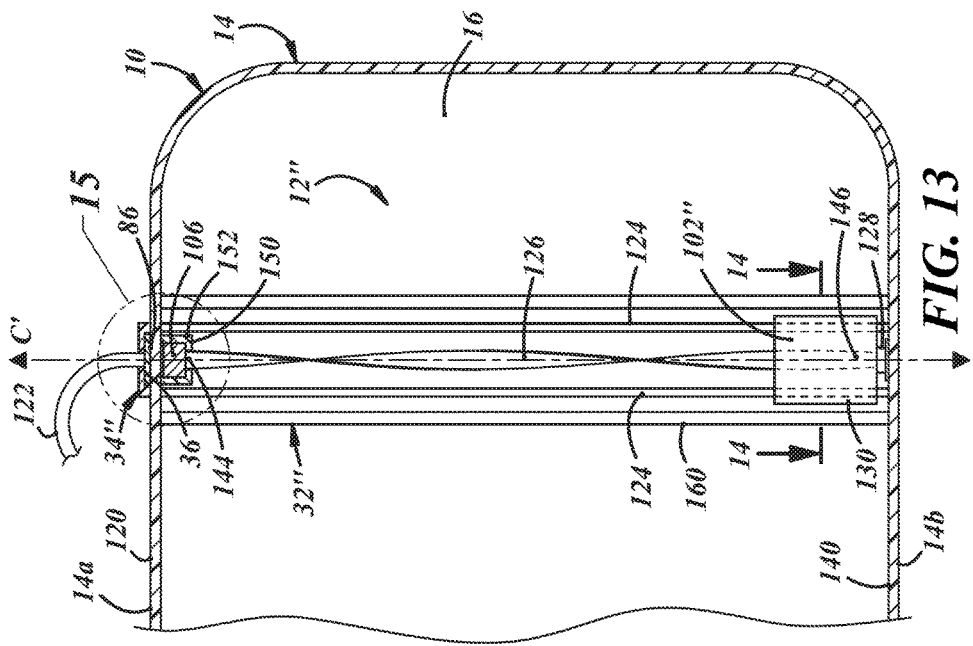
FIG. 13 illustrates a partial sectional view of the level sender shown in FIG. 12.
Figure 12:
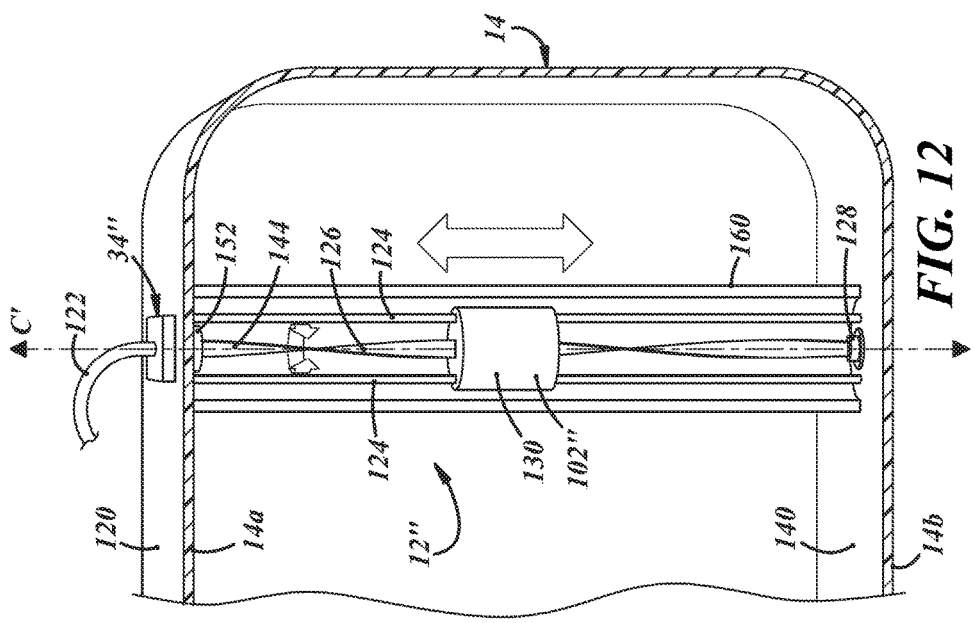
FIG. 12 illustrates a perspective and sectional view of a portion of a fuel tank and a contactless a level sender.

As shown in FIGS. 12-13, carrier 34" carries the sensor device 36 on an outer surface 120 of an upper tank wall 14a; the carrier 34" may or may not be fully enclosed or sealed. Also, carrier 34" is not required; e.g., in other implementations, the sensor device 36 may be at least partially overmolded by material in a tank formation process (e.g., as described more below), embedded, or both in another structure such as, but not limited to the tank wall 114. In the illustrated implementation, a wiring harness 122 is shown coupled to sensor device 36 and extends away therefrom (e.g., to a fuel level gauge or other controller electronics not shown).

Sensor device 36 may be identical to the previously described device (e.g., the AS5600 by AMS or the A1332 by Allegro) or may be any other similar contactless sensor. Device 36 may be positioned along axis C' and may be oriented with the sensing surface 86 facing the portion of the level sender located within tank 10 (e.g., in the illustrated implementation, sensor surface 86 is adjacent outer surface 120); however, this is not required. For example, in other implementations, there may be a gap between device 36 and tank wall 14. Regardless, in at least one embodiment, at least a portion of the tank wall 14 is between the sensor device 36 and the interior of tank 10.

Figure 14:
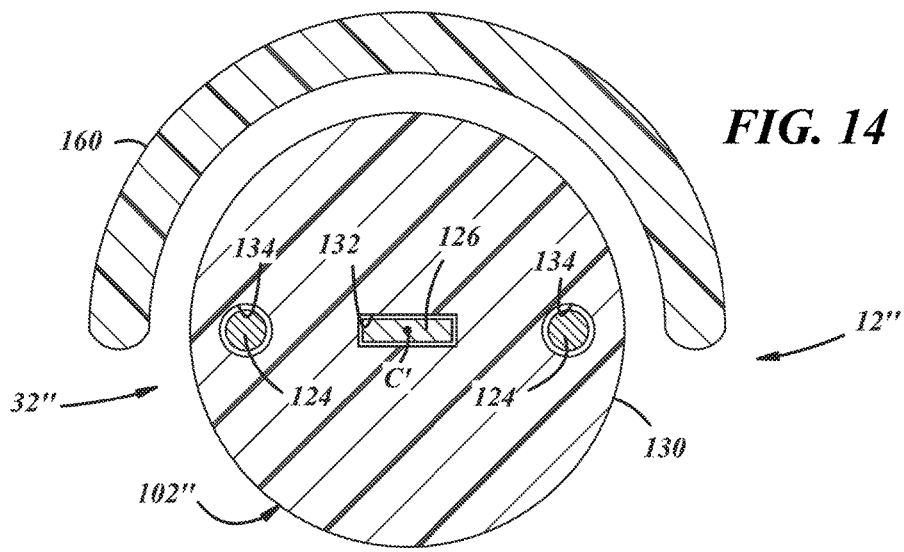
FIG. 14 illustrates a sectional view of a float of the level sender shown in FIG. 13 along section lines 14-14.
Figure 15:
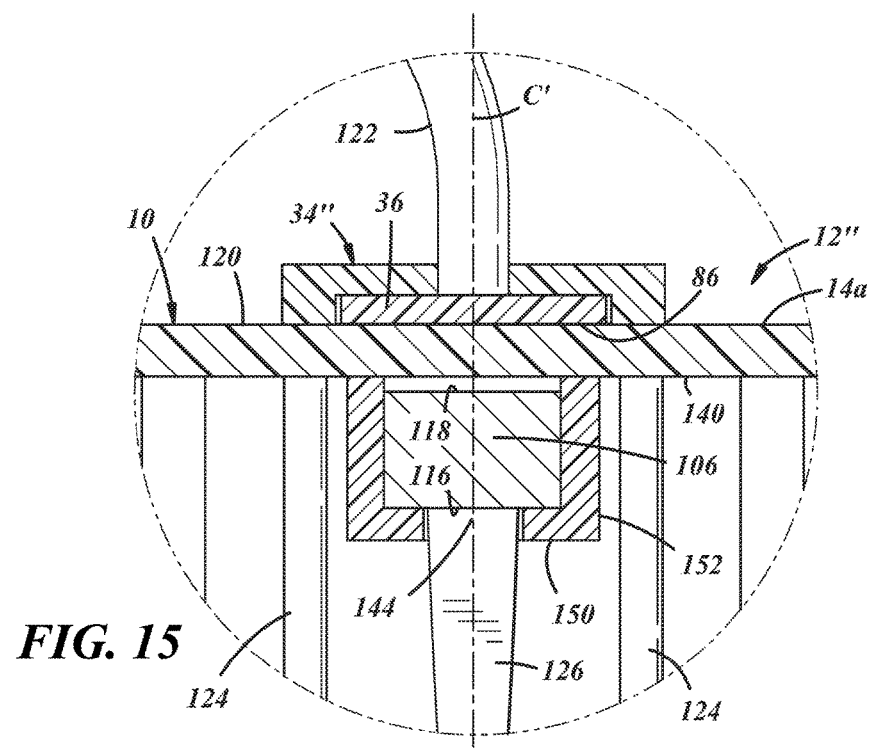
FIG. 15 illustrates an enlargement of a portion of the level sender and tank shown in FIG. 13.

In at least some implementations, float assembly 32" is positioned within tank 10 between the upper tank wall 14a and a lower tank wall 14b and includes a float 102", one or more guides or guide rods 124 which may be parallel to axis C', a driving member 126 and a swivel 128 along axis C', and the driven member 106 on or parallel to axis C' and aligned with sensor device 36 (the driven member 106 being described above having axial end 118 facing sensor device 36, FIG. 15). Float 102" may have a body 130 with an axially-extending driving passage 132 and at least one axially-extending guide passage 134 (best shown in FIG. 14)—e.g., passage 132 may be generally coincident with axis C', and passages 134 may be generally parallel thereto. The illustrated float 102" has two guide passages 134, but this is not required. The passages 132, 134 may have any suitable cross-sectional shape. For example, in at least one embodiment, driving passage 132 may have a generally rectangular cross-section. Also, the illustrated body 130 is cylindrical; however, this is merely an example, and other shapes are possible.

In the implementation shown in FIGS. 12-13, guide(s) 124 extend from an inner surface 140 at the upper tank wall 14a to the inner surface 140 at the lower tank wall 14b (e.g., being coupled to tank 10 at each end). In the illustrated embodiment, guides 124 are shown as cylindrical rods having a diameter smaller than guide passages 134 (see FIG. 14) so that the float 102" may move between the upper and lower tank walls 14a, 14b relatively freely along the rods. In other implementations, more or fewer guides 124 may be used. A few non-limiting cross-sectional shapes of guides 124 include a rectangular cross-section, a triangular cross-section, or a "+" or cross-shaped cross-section. It should be appreciated that while the embodiments of FIGS. 12-13 show perpendicularly-oriented guides with respect to the upper and lower tank walls 14a, 14b, this is not required. For example, the orientation of the guides 124 may differ and in some embodiments could be coupled to a side wall of tank 10.

The driving member 126 includes any suitable driving component extending generally between from or near the upper and lower tank walls 14a, 14b along axis C'. Driving member 126 is adapted to carry float assembly 32" and move (e.g., rotate) as float assembly 32" moves between walls 14a, 14b. A first end 144 of driving member 126 (e.g., nearer upper tank wall 14a) may be coupled to driven member 106. A second, opposite end 146 of driving member 126 (e.g., nearer lower tank wall 14b) may be coupled to swivel 128—swivel 128 being fixed to the tank wall inner surface 140 but allowing rotation of driving member 126. In the illustrated embodiment, driving member 126 is shown as a helical device—e.g., a longitudinally-extending strip having a rectangular cross-section that is twisted through one full rotation—however, this is merely an example. The driving member 126 may be sized to be received through driving passage 132 in the float body 130, and its cross-sectional shape may vary in other embodiments. Further, a helical embodiment is not required either; e.g., driving member 126 could be any device that causes rotation of the float 102" as a function of liquid level sensing—e.g., a longitudinally-extending ratcheting device (e.g., where driving passage 132 has corresponding ratcheting elements causing driving member 126 to move/rotate as the float 102" moves along its length).

As shown best in FIGS. 13 and 15, tank 10 may include a carrier 150 for driven member 106 on or near the inner surface 140 of the upper tank wall 14a; and axis C' may pass through carrier 150. The carrier 150 may comprise any suitable walls, tabs, or fingers 152 extending radially inwardly from the tank wall 14 adapted to carry and/or orient the driven member 106 (within tank 10) with the sensor device 36 (which is mounted outside the tank 10). Fingers 152 may be arranged so that driven member 106 may rotate therebetween. The arrangement and location of the driven member 106 may facilitate sensor device 36 determining a level of fluid in tank 10 based on an angular position of driven member 106 and may operate as previously described. Thus, driven member 106 may be aligned with a predetermined region of sensing surface 86 of sensor device 36 or may be purposely offset. This alignment and determination also was previously described and will not be re-described here.

In FIGS. 12-14, a guard or baffle 160 is shown which minimizes undue movement of float 102" caused by tank slosh (e.g., thereby minimizing level sensing error). Guard 160 is shown as a half-pipe extending partially around float assembly 32"; this of course is merely an example and other examples exist. For instance, guard 160 could be any barrier having holes or flow path(s) that allow fluid in tank 10 to pass therethrough. For example, in one implementation, the barrier extends entirely around the float assembly 32". Further, baffle 160 is not required.

During operation of this embodiment, the float 102" is moved up and down along the guide(s) 124 in response to a changing fluid level in tank 10. As float 102" moves up (e.g., as fluid is added to tank 10), driving member 126 may be rotated in a first direction (e.g., clockwise) as the driving member 106 passes through the driving passage 132 of float 102". And as float 102" moves down (e.g., as fluid is pumped from tank 10), driving member 126 may be rotated in a second direction (e.g., counterclockwise) as the driving member passes through the driving passage 132. As the float 102" moves up or down, guide(s) 124 inhibit rotation of float 102", and the driving member 126 is rotated instead (e.g., as the helical device 126 passes through the rectangular passage 132). Further, as the driving member 126 rotates, so does the driven member 106. As previously discussed, sensor device 36 may determine a level of fluid in tank 10 based on a rotational or angular position of driven member 106 with respect to the contactless sensor 76 of sensor device 36.

Figure 17:
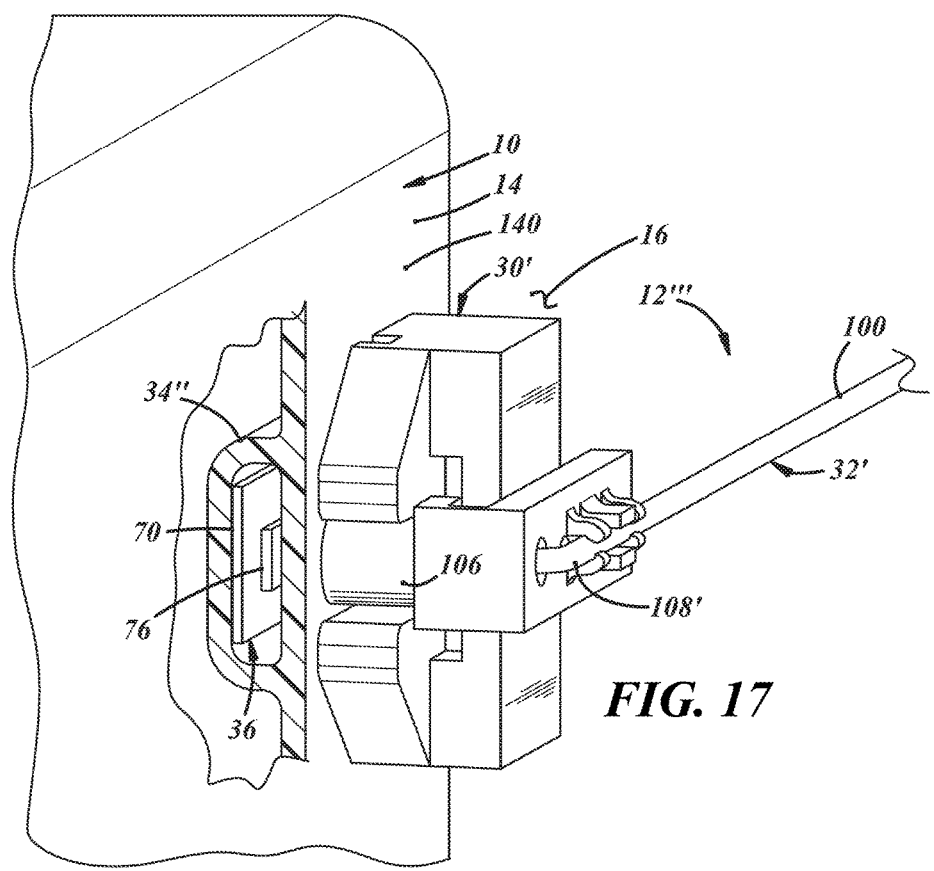
FIG. 17 illustrates a partial perspective view of a level sender carried by a wall of the tank, a portion of the wall being cut away.

Still other embodiments exist which isolate the sensor device 36 from the fluid carried by tank 10. For example, sensor device 36 could be located on at exterior of side wall 14 and a float assembly could be mounted to an interior of side wall 14—so that at least a portion of tank wall material is between the sensor 36 and driven member 106. FIG. 17 illustrates one example of a level sender 12''' (where again like numerals represent like or similar elements having similar functions)—mount 30' may be coupled to the inner surface 140 of wall 14 and extend into the interior volume 16 of the tank 10, and carrier 34'', on the outside of tank 10, may carry sensor 36. Mount 30' enables float arm 32' (which carries driven member 106) to pivot at a coupler (hidden in FIG. 17) in response to a change in a level of fluid in tank 10 (e.g., as a float (not shown) at the opposing end of the float arm 32' rises or falls). The carrier 34'' may not be enclosed (as shown) and, in some implementations, may be omitted. In at least one implementation, sensor 36 may be at least partially overmolded by material in a tank formation process (e.g., as described more below). As previously described, the driven member 106 may be aligned or positioned with respect to the sensor 36 (and more specifically, may be aligned or positioned with respect to sensor 76 on CCA 70). And again, by detecting rotational changes by contactless sensing through wall 14, sensor device 36 may determine a level of fluid in tank 10.

In another implementation, the level sender may be provided in tank 10 during a manufacturing process for the tank 10. The tank 10 may be molded from a polymeric material in a mold having two halves. A brief overview of the process is described below.

Generally, one or both mold halves may carry tank components (e.g., such as carrier 34'' or sensor device 36 with carrier 34'') for at least partially embedding or overmolding the components in outer surface 120 of tank 10. An extruded parison used to form tank 10 may be provided into the mold, between the separated mold halves. Next, the mold halves may be at least partially closed and pressurized gas (e.g., air) may be provided into an interior of the parison using a blow pin to pre-blow the parison outwardly into the mold cavity. The pre-blow may embed or overmold into tank wall 14 any tank components carried by the mold halves (at least partially). Thereafter, the parison material may be separated into parison halves or portions, such as by cutting or tearing the parison, with one parison half in each mold half. The mold halves then may be opened to expose the interior of the parison halves. This provides access to the interior of the parison so that other tank components (e.g., such as the float assembly 32, 32', or 32'') may be introduced within the interior of the parison (e.g., by a robot arm) before the mold halves are closed together and final blow molding of tank 10 occurs with the component(s) integrated into the tank interior. One such method of forming a parison and separating a parison into parison halves in order to locate components therein is disclosed in U.S. Patent Application Publication 2009/0324866, the disclosure of which is incorporated by reference herein in its entirety.

According to the process described above, in another embodiment, a portion of level sender 12'' (e.g., of FIG. 12) (e.g., carrier 34'', sensor device 36, or both) is carried by one of the mold halves and is at least partially molded over or into the extruded parison (e.g., so as to be outside the tank 10). And another portion of level sender 12'' (e.g., the float assembly 32'') may be carried by the robot arm and be provided into the interior of tank 10 after the parison is cut or torn and the mold halves separated. The float assembly 32'' may be aligned so that the carrier 150 (having driven member 106 therein) becomes proximate the carrier 34'' (having the sensor device 36 therein) as the mold halves close. Similarly, swivel 128 may be located in another region of tank wall 14.

In some embodiments, the float assembly 32'' may provide stiffness and rigidity between tank walls 14 (e.g., between tank wall 14a and 14b)—e.g., where both ends of the float assembly 32'' are coupled to different portions of the tank wall 14. For example, forces tending to separate the fuel tank walls 14 (e.g. expand the fuel tank outwardly) may occur due to increased pressure within the tank 10, or the weight of fuel in a full tank acting on the fuel tank wall. Further, temperature increases (both ambient temperature outside of the fuel tank 10 and the temperature within the fuel tank) can decrease the stiffness, rigidity, or strength of a polymeric fuel tank. Therefore, in some embodiments, guide(s) 124 of float assembly 32'' may be used to contain fluid at increased pressures and/or with increased temperatures compared to tanks without such features. Further, due to the increased stiffness and rigidity of the fuel tank 10 provided by the float assembly 32'', a thinner fuel tank wall 14 can be used in applications compared to fuel tanks 10 without the assembly 32'', which may lead to a cost savings and, in some instances, a weight savings.

In another tank manufacturing implementation, the level sender may be provided in tank 10 during a manufacturing process in which tank 10 is formed from an uncut or undivided cylindrical parison introduced between two open mold halves. The mold halves may or may not carry tank components to be mounted on the exterior of tank 10. In some instances, this process may include an arm which introduces a components carrier carrying one or more fuel tank components (e.g., level sender 12, or 12', or float assembly 32'') through an open end of the parison. The mold halves may be partially closed, an opposing end of the parison may be at least partially closed, and pressurized air may be provided into the parison to initially and partially expand it. The arm may position and/or align the components carrier and tank components within the interior, and then the mold halves may be partially closed. Thereafter, the arm may be removed leaving the components carrier and the components in place within the parison. Then, the mold halves may be fully closed engaging the components carrier, tank components, or both in parison material. During this process, and even after the mold is fully closed, additional pressurized air may be provided into the parison—e.g., to maintain the parison open and prevent it from collapsing and to form the parison into the desired fuel tank shape. Other aspects of this method are disclosed in U.S. Pat. No. 6,712,234, the disclosure of which is incorporated by reference herein in its entirety.

According to the process described above, in one embodiment, the level sender 12 or 12' with the components carrier is provided into the interior of tank 10 by the arm. And as described above, the mold halves are partially closed, the arm is removed leaving the components carrier and level sender 12 or 12' in place, and the mold halves are then fully and eventually closed. It will be appreciated that the component carrier provided into the interior of tank 10 via arm could include other components as well (e.g., the fuel pump 18, reservoir 20, etc., just to name a couple examples).

According to another embodiment, the components carrier is or includes a bracket adapted to couple to mount 30 or 30' or to a portion of level sender 12. The bracket is received into the parison and the parison hardens carrying the bracket. The level sender 12 or 12' later may be received into the interior of the hardened tank 10 via a tank opening and coupled to the bracket.

According to another embodiment, a portion of level sender 12'' (e.g., carrier 34'', sensor device 36, or both) is carried by one of the mold halves and is at least partially molded over or into the extruded parison (e.g., so as to be outside the tank 10). And another portion of level sender 12" (e.g., the float assembly 32") may be carried by the arm (e.g., on the components carrier) and be provided into the interior of tank 10 via the open end of the parison. The arm may position and align float assembly 32" so that the carrier 150 (having driven member 106 therein) becomes proximate the carrier 34" (having the sensor device 36 therein) as the mold halves close. Similarly, another region of tank wall 14 may receive swivel 128 (via the arm) as the mold halves close. The arm may hold the float assembly 32" and swivel 128 as the halves continue to close, and then the arm may be withdrawn from between the mold halves so that the mold may be further and eventually, fully closed. As discussed above, level sender 12" may remain in this position until the parison material hardens.

In another tank manufacturing implementation, fuel tank 10 may be formed from sheets of material, such as in a vacuum forming or other type of process. With mold halves opened, material may be provided into both mold halves (e.g., in some implementations overlapping carrier 34". The material may then be formed into the mold cavities such as by vacuum forming. As described above, the float assembly 32" may be provided between the mold halves before they are closed so that the float assembly 32" is coupled to the tank walls 14 as the mold halves close to form tank 10. A similar process could be employed to receive level sender 12 or 12' (e.g., except that the mold halves may not carry level sender components).

In another tank manufacturing implementation, tank 10 may be formed and hardened before at least a portion of level senders 12, 12', or 12" are introduced. For example, once the tank material has hardened, the level sender may be located within the interior of tank 10 such as by being inserted through an opening in the tank wall 14. For example, level sender 12 or 12' could be coupled to the tank wall 14, the fuel pump 18, the reservoir 20, or any other suitable location within tank 10 (e.g., such as to a flange or supports between a flange and the reservoir). Similarly, float assembly 32" could be coupled to any suitable portion of the tank 10 or other tank component as well. The carrier 34" (and/or sensor device 36) may be coupled to the outer surface 120 of tank 10 after the tank has hardened, or may be formed with the tank 10 according to any of the processes described above.

Figure 16:
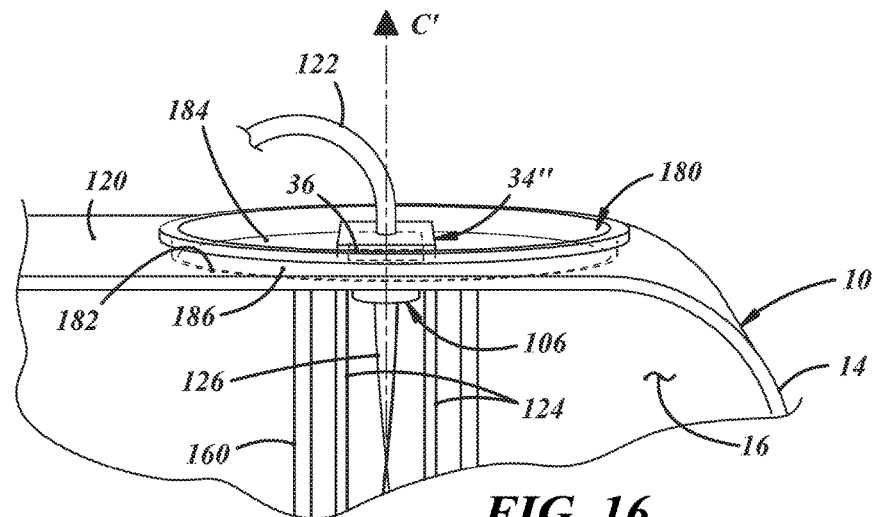
FIG. 16 illustrates a partial perspective view of a level sender carried by a flange in the tank.

In at least one implementation of level sender 12" (see FIG. 16), a flange 180 may be sealed to tank 10 to close an opening 182 in the tank wall 14 through which components were inserted into the tank 10. The flange 180 may carry the sensor device 36 at least partially on or in an outer side 184 of the flange 180 while the driven member 106 may be carried at an inner side 186 of the flange 180 so that at least a portion of the flange separates the device 36 and driven member 106. Thus, the flange 180 may be considered part of the tank wall 14. Other aspects of this embodiment may be similar to that shown in FIGS. 12-15.

Thus, there has been described a level sender for a fluid tank. The level sender comprises a mount and a float assembly, wherein the mount carries a contactless sensor such as a contactless potentiometer and the float assembly carries a driven member such as a diametric magnet. In operation, the driven member and contactless sensor magnetically couple and interact and provide an electrical output indicative of a level of fuel in the tank.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A level sender for a tank, comprising:
   a sensor device comprising a contactless sensor defining a central axis;
   a driven member comprising a magnet having a longitudinal axis aligned with the central axis such that the magnet is configured to axially rotate about the central axis, wherein the sensor device is configured to determine a level of fluid within the tank based on an axially rotated position of the driven member; and
   a float assembly comprising a driving member, a swivel and a float, the driving member configured to axially rotate the driven member about the central axis, the driving member being directly coupled to the magnet at one end and coupled to the swivel at a second end,
   wherein the float has a body with an axially-extending driving passage, the body moving up and down along the longitudinal axis aligned with the central axis to drive rotation of the driving member, and
   wherein a carrier with the sensor device is separately attached to an outside of the tank, and the driven member with the float assembly is provided inside the tank and aligned to the carrier so that the driven member becomes proximate the sensor device.

2. The level sender of claim 1, wherein the contactless sensor is a contactless potentiometer.

3. The level sender of claim 1, wherein the swivel is fixed to an inner surface of the tank and configured for allowing rotation of the driving member.

4. The level sender of claim 1, wherein the driven member is a diametric magnet and an axial end of the diametric magnet faces the contactless sensor.

5. The level sender of claim 4, wherein the axial end of the diametric magnet includes a north pole surface and a south pole surface that faces the contactless sensor, and wherein the magnet is arranged such that the central axis passes through the magnet between the north pole surface and the south pole surface.

6. The level sender of claim 1, wherein the float assembly further comprises one or more guides or guide rods parallel to the central axis, and the body of the float further includes at least one axially-extending guide passage parallel to the central axis.

7. The level sender of claim 1, wherein the driven member is axially positioned within a predetermined proximity of the sensor device.

8. The level sender of claim 1, wherein the driving member is a helical device with a longitudinally-extending strip that is twisted through one full rotation.

9. The level sender of claim 8, wherein the helical device passes through the axially-extending driving passage of the float body.

10. A method for determining a level of fluid within a tank, the method comprising:
    axially rotating a driven member comprising a magnet via a float assembly that is in communication with fluid within the tank and that comprises a driving member, a swivel and a float, the driving member being directly coupled to the magnet at one end and coupled to the swivel at the second end, the magnet defining a longitudinal axis about which the magnet rotates, the magnet and the one end of the driving member rotating together about the longitudinal axis; and using a sensor device that comprises a contactless sensor defining a central axis, determining an axially rotated position of the driven member associated with the level of fluid within the tank, wherein the float has a body with an axially-extending driving passage, the body moving up and down along the longitudinally axis aligned with the central axis to drive rotation of the driving member, and wherein a carrier with the sensor device is separately attached to an outside of the tank, and the driven member with the float assembly is provided inside the tank and aligned to the carrier so that the driven member becomes proximate the sensor device.

11. The method of claim 10, wherein the contactless sensor is a contactless potentiometer.

12. The method of claim 10, wherein the magnet is a diametric magnet.

13. The method of claim 12, wherein an axial end of the diametric magnet faces the contactless sensor.

14. The method of claim 13, wherein the axial end of the diametric magnet includes a north pole surface and a south pole surface that faces the contactless sensor.

15. The method of claim 14, wherein the magnet rotates about the central axis, and wherein the magnet is arranged such that the central axis passes through the magnet between the north pole surface and the south pole surface.

16. The method of claim 10, wherein the swivel is fixed to an inner surface of the tank and configured for allowing rotation of the driving member.

17. The method of claim 10, wherein the float assembly further comprises one or more guides or guide rods parallel to the central axis, and the body of the float further includes at least one axially-extending guide passage parallel to the central axis.

* * * * *